(12) United States Patent
Likus

(10) Patent No.: US 12,397,388 B2
(45) Date of Patent: Aug. 26, 2025

(54) HOUSING PART FOR A PNEUMATIC CLAMPING AND/OR BRAKING DEVICE

(71) Applicant: HEMA Maschinen-und Apparateschutz GmbH, Seligenstadt (DE)

(72) Inventor: Edmund Likus, Seligenstadt (DE)

(73) Assignee: HEMA Maschinen—und Apparateschutz GmbH, Seligenstadt (DE)

( * ) Notice: Subject to any disclaimer, the term of this patent is extended or adjusted under 35 U.S.C. 154(b) by 0 days.

(21) Appl. No.: 18/861,648

(22) PCT Filed: Feb. 5, 2024

(86) PCT No.: PCT/EP2024/052701
§ 371 (c)(1),
(2) Date: Oct. 30, 2024

(87) PCT Pub. No.: WO2024/188534
PCT Pub. Date: Sep. 19, 2024

(65) Prior Publication Data
US 2025/0108465 A1    Apr. 3, 2025

(30) Foreign Application Priority Data

Mar. 15, 2023    (DE) .................... 20 2023 101 258.2
Mar. 15, 2023    (EP) .................... 23161999

(51) Int. Cl.
*B23Q 1/28*    (2006.01)
*B23Q 16/10*    (2006.01)

(52) U.S. Cl.
CPC ............. *B23Q 1/287* (2013.01); *B23Q 16/10* (2013.01)

(58) Field of Classification Search
CPC ............ B23Q 1/28–287; B23Q 16/105; B23Q 16/107; B23Q 3/107; B23Q 3/108
See application file for complete search history.

(56) References Cited

U.S. PATENT DOCUMENTS

| | | |
|---|---|---|
| 6,923,714 B1 | 8/2005 | Zuniga et al. |
| 7,101,272 B2 | 9/2006 | Chen et al. |
| (Continued) | | |

FOREIGN PATENT DOCUMENTS

| | | |
|---|---|---|
| AT | E342149 T1 | 11/2006 |
| AT | E376132 T1 | 11/2007 |
| (Continued) | | |

OTHER PUBLICATIONS

International Search Report and Written Opinion mailed Feb. 27, 2024 in connection with International Application No. PCT/EP2024/052701.

*Primary Examiner* — Tyrone V Hall, Jr.
(74) *Attorney, Agent, or Firm* — Wolf, Greenfield & Sacks, P.C.

(57) ABSTRACT

This disclosure describes a housing part for a pneumatic clamping and/or braking device, the housing part comprising: an annular recess for clamping an annular spring plate between a first contact surface of the housing part defined by the recess and a second contact surface of the housing part defined by the recess; a clamping element having a clamping surface which is designed, when the spring plate is clamped in the recess between the first contact surface and the second contact surface in such a way that a first end of the spring plate is supported on the first contact surface, the spring plate extends from the first contact surface to the second contact surface, and a second end of the spring plate presses on the second contact surface, to transmit a clamping and/or braking force to an object to be clamped and/or braked; wherein the housing part comprises a first latching means (Continued)

and a second latching means, wherein, when the spring plate is clamped in the recess between the first contact surface and the second contact surface, the first latching means is designed to latch the first end of the spring plate on the first contact surface and the second latching means is designed to latch the second end of the spring plate on the second contact surface. The disclosure further describes a clamping and/or braking device for clamping and/or braking an object to be clamped and/or braked, comprising two of the housing parts.

23 Claims, 7 Drawing Sheets

(56) References Cited

U.S. PATENT DOCUMENTS

| | | | |
|---|---|---|---|
| 7,392,886 B2 * | 7/2008 | Hofmann | B23Q 1/287 |
| | | | 188/67 |
| 7,584,828 B2 * | 9/2009 | Hofmann | F16D 63/008 |
| | | | 188/166 |
| 8,888,563 B2 | 11/2014 | Moriya | |
| 9,327,376 B2 | 5/2016 | Gamboa | |
| 2004/0005842 A1 | 1/2004 | Chen et al. | |
| 2005/0211377 A1 | 9/2005 | Chen et al. | |
| 2005/0245181 A1 | 11/2005 | Chen et al. | |
| 2006/0042892 A1 | 3/2006 | Hofmann | |
| 2007/0090610 A1 | 4/2007 | Hofmann | |
| 2008/0000346 A1 | 1/2008 | Hofmann | |
| 2008/0119122 A1 | 5/2008 | Zuniga et al. | |
| 2021/0331285 A1 | 10/2021 | Nakano et al. | |
| 2025/0108486 A1 | 4/2025 | Likus | |

FOREIGN PATENT DOCUMENTS

| | | | | |
|---|---|---|---|---|
| AU | 2003287866 A1 | 8/2004 | | |
| CN | 1842663 A | 10/2006 | | |
| CN | 107127360 A | 9/2017 | | |
| DE | 10 335 795 A1 | 3/2005 | | |
| DE | 10 2004 010987 A1 | 9/2005 | | |
| DE | 102010046451 A1 * | 3/2012 | | F16C 41/001 |
| DE | 10 2021 006 219 B3 | 12/2022 | | |
| EP | 1 585 616 A1 | 10/2005 | | |
| EP | 1 629 939 A1 | 3/2006 | | |
| EP | 1 651 881 A1 | 5/2006 | | |
| EP | 1 585 616 B1 | 10/2006 | | |
| EP | 1 651 881 B1 | 10/2007 | | |
| ES | 2 274 289 T3 | 5/2007 | | |
| ES | 2 295 903 T3 | 4/2008 | | |
| JP | 2006-513049 A | 4/2006 | | |
| JP | 2007-501361 A | 1/2007 | | |
| JP | 2007-526427 A | 9/2007 | | |
| JP | 4602256 B2 | 12/2010 | | |
| JP | 4607110 B2 | 1/2011 | | |
| JP | 4847438 B2 | 12/2011 | | |
| KR | 20060024334 A | 3/2006 | | |
| PL | 1651881 T3 | 3/2008 | | |
| WO | WO 2004/067222 A1 | 8/2004 | | |
| WO | WO 2005/015047 A1 | 2/2005 | | |
| WO | WO 2005/085653 A1 | 9/2005 | | |
| WO | WO 2006/021120 A1 | 3/2006 | | |

\* cited by examiner

HOUSING PART FOR A PNEUMATIC CLAMPING AND/OR BRAKING DEVICE

CROSS-REFERENCE TO RELATED APPLICATIONS

This application is a national stage filing under 35 U.S.C. § 371 of International Application No. PCT/EP2024/052701, filed Feb. 5, 2024, which claims the benefit of European Application No. 23161999.0, filed Mar. 15, 2023 and German Application No. 20 2023 101 258.2, filed Mar. 15, 2023. The contents of these applications are incorporated herein by reference in their entirety.

TECHNICAL FIELD

The disclosure relates to a housing part for a pneumatic clamping and/or braking device and to a pneumatic clamping and/or braking device having such a housing part.

BACKGROUND OF THE INVENTION

In the production of tool or machine parts, processing machines, in particular work spindles or other machine tools, are used which process material from a workpiece by means of tools fastened to a shaft, in particular in order to bring it into the desired shape. The shaft can be an axis of rotation or pivot axis of such a machine. Furthermore, rotatable or pivotable tables are used by means of a shaft to place tools or workpieces in the suitable processing position or to move workpieces at corresponding rotational speeds. A prerequisite for precise and efficient processing is, inter alia, a high rotational speed of the shaft. Emergency or safety systems therefore have the task of stopping the shaft in the event of malfunction or failure of the systems, such as, for example, power failure or cable breakage, or of holding it in a fixed position and thus fixing it.

Conventional processing machines have electromagnetic, hydraulic or pneumatic clamping and/or braking devices. Such devices have a friction lining which can be frictionally connected to the shaft by means of force transmission. As a result, fixing of the shaft at different speeds is made possible.

In the case of hydraulic clamping devices, a chamber is charged with hydraulic oil and clamps the rotating shaft or disc. Passive hydraulic clamps are also known. However, such hydraulic clamps have long reaction times or short reaction times require a very high outlay there. Furthermore, the hydraulic material, in particular hydraulic valves and hydraulic tubes, is costly and requires longer assembly times. The hydraulic oil also has an additional outlay for maintaining the cleanliness in the surroundings of a hydraulic clamp.

In the case of pneumatic clamping and/or braking devices, elastic components, in particular resilient plates, are usually charged with compressed air and can overcome some of the stated disadvantages of hydraulic clamping devices.

EP 1 585 616 B1 and EP 1 651 881 B1 describe pneumatic clamping devices having two annular spring plates which are introduced into a housing of the clamping devices and form there a pressure space which can be charged with compressed air or can be ventilated and vented in order to change the bending of the spring plates and thereby to change between a closed state of the clamping devices, in which an object to be clamped, like a rotatable shaft, is clamped, and an open state of the clamping devices, in which the object is free. However, it has been shown in practice that the desired opening and closing function of the pneumatic clamping devices cannot be achieved axially symmetrically over the circumference of the annular spring plates. Thus, for example, a non-uniform clamping force distribution on the circumference of the shaft and associated damage to the shaft was observed.

BRIEF DESCRIPTION OF THE INVENTION

Proceeding from the prior art mentioned in the introduction, the disclosure is based on the object of enabling a pneumatic clamping and/or braking device to reliably achieve its desired symmetrical opening and closing function.

This object is achieved with a housing part having the features of claim 1 and with a clamping and/or braking device having the features of claim 15. Preferred embodiments are described in the dependent claims, in the description and in the figures.

According to the solution according to the invention, a housing part for a pneumatic clamping and/or braking device is proposed, the housing part comprising: an annular recess for clamping an annular spring plate between a first contact surface of the housing part defined by the recess and a second contact surface of the housing part defined by the recess; a clamping element having a clamping surface which is designed, when the spring plate is clamped in the recess between the first contact surface and the second contact surface in such a way that a first end of the spring plate is supported on the first contact surface, the spring plate extends from the first contact surface to the second contact surface, and a second end of the spring plate presses on the second contact surface, to transmit a clamping and/or braking force to an object to be clamped and/or braked; wherein the housing part comprises a first latching means and a second latching means, wherein, when the spring plate is clamped in the recess between the first contact surface and the second contact surface, the first latching means is designed to latch the first end of the spring plate on the first contact surface and the second latching means is designed to latch the second end of the spring plate on the second contact surface.

According to the solution according to the invention, a clamping and/or braking device for clamping and/or braking an object to be clamped and/or braked is furthermore provided, the device comprising: a housing comprising a first housing part according to the invention and a second housing part according to the invention, wherein the two housing parts are arranged with respect to one another and fastened to one another in such a way that the recesses of the first and second housing parts together form an inner space within the housing; a spring (e.g. a bending spring, such as a leaf spring) arranged in the inner space comprising a first annular spring plate (e.g. a bending spring, such as a leaf spring) and a second annular spring plate (e.g. a bending spring, such as a leaf spring), wherein the spring plates are arranged within the inner space in such a way that at least one pressure space is formed in the inner space, which pressure space is at least partially delimited by the spring plates, wherein the pressure space is ventilatable or ventable and can be acted on by positive pressure of a pressure medium (e.g. compressed air) which is suppliable to the housing, wherein the first spring plate is clamped between the first contact surface of the first housing part and the second contact surface of the first housing part in such a way that a first end of the first spring plate is latched by the first latching means of the first housing part and a second end of the first spring plate is latched by the second latching means of the first housing part; wherein the second spring plate is clamped between the first contact surface of the second housing part and the second contact surface of the second housing part in such a way that a first end of the second spring plate is latched by the first latching means of the second housing part and a second end of the second spring plate is latched by the second latching means of the second housing part; and wherein the spring plates are arranged relative to the at least one pressure space in such a way that, by ventilating or venting the pressure space or acting on the pressure space with positive pressure, a bending of at least one of the spring plates (e.g. transverse bending; bending perpendicular to the longitudinal axis of the spring plate; the longitudinal axis connects the two ends of each spring plate) can be changed and as a result the device changes between an open state, in which the object is spaced apart from the clamping surfaces, and a closed state, in which one or more of the clamping surfaces transmit a clamping and/or braking force to the object. For example, the device can change from the closed state to the open state or vice versa. In the open state of the device, the object is freely movable (e.g. freely rotatable about an axis of rotation or linearly movable along the axis), while in the closed state of the device, the object is clamped and/or braked and is thus not freely movable (e.g. not rotatable about the axis of rotation or not linearly movable along the axis).

As used herein, the term "ventilating" is intended to mean "allowing air to enter", and the term "venting" is intended to mean "allowing air to exit".

The present disclosure is based on the finding of the inventors that the axial positioning of the spring plates within the housing of the clamping and/or braking device is of decisive importance for the opening and closing function of the clamping and/or braking device. In particular, the inventors have recognized that the axial positioning of the spring plates during assembly has hitherto decisively depended on the axial press-in pressure and therefore the spring plates could easily assume different axial positions within the housing. The inventors have recognized that a well-defined and symmetrical positioning of the spring plates within the housing should be reliably achieved in order to reliably achieve the desired symmetrical opening and closing function of the clamping and/or braking device. Such a well-defined and symmetrical positioning of the spring plates within the housing has hitherto placed high demands on the axial pressing of the springs into the housing during assembly and has hitherto proven to be difficult and expensive in practice.

Against this background, the inventors have recognized that a predetermined axial positioning of the spring plates within a housing of a pneumatic clamping and/or braking device is achieved by a housing part which comprises a first latching means and a second latching means, which are each designed to latch in another end of a clamped spring plate, which predetermined axial positioning no longer decisively depends on the axial press-in force during assembly, but a repeatable, well-defined and symmetrical positioning of the spring plates within the housing of the clamping and/or braking device is achieved. These latching means have also proven themselves in practice during assembly since they even simplify the assembly of the spring plates. In addition, the latching means bring about further advantages of the type described below, such as, for example, improved sealing within the housing, so that the latching means have a diverse positive effect on the operation of the overall system of the clamping and/or braking device.

The first latching means preferably comprises a first projection and a first stop, which each delimit the first contact surface in such a way that the first latching means is designed to latch in the first end of the spring plate between the first projection and the first stop in the region of the first contact surface. The second latching means can preferably comprise a second projection and a second stop, which each delimit the second contact surface in such a way that the second latching means is designed to latch in the second end of the spring plate between the second projection and the second stop in the region of the second contact surface. A particularly effective latching of the spring plates is brought about by this special implementation of the first and second latching means, but these also at the same time facilitate the insertion of the spring plates into the housing parts and do not require additional components and materials for the housing, which is advantageous for the production and assembly.

Each of the projections can comprise a height transition at the transition of the projection to the associated or adjacent contact surface. Each of the projections can comprise a step or ramp as a height transition. The ramp can be an oblique plane, but can also have differently shaped slopes, such as, for example, a curvature. Other configurations of the projections are, however, likewise conceivable.

Particularly preferably, each of the projections can project by 0.025 mm to 0.15 mm, preferably 0.05 mm to 0.1 mm, particularly preferably by 0.1 mm or 0.05 mm with respect to the respective contact surface in a radial direction of the annular recess into the recess. Such a projection by the projections can be particularly advantageous for the reliable latching of the spring plates with regard to customary shortenings of the spring during operation, on the one hand, and the simple insertion of the spring plates into the housing parts, on the other hand.

The annular recess can define an annular opening in the housing part, wherein the annular opening is formed between a first annular edge of the housing part and a second annular edge of the housing part. The first projection can preferably be arranged between the first annular edge and the first contact surface on an inner side of the housing part in the region of the recess and can optionally extend from the first annular edge as far as the first contact surface. The height transition of the first projection can adjoin the first contact surface. The height transition (e.g. the step or ramp) of the first projection can preferably be arranged on the inner side of the housing part in the region of the recess at a distance of 1 mm to 1.8 mm, preferably 1 mm to 1.5 mm, particularly preferably 1.2 mm or 1.1 mm from the first annular edge and the first projection can extend over this distance. The first projection can extend continuously from the first annular edge to the height transition. The second projection can preferably be arranged between the second annular edge and the second contact surface on an inner side of the housing part in the region of the recess and can optionally extend from the second annular edge to the second contact surface. The height transition of the second projection can adjoin the second contact surface. The height transition (e.g. the step or ramp) of the second projection can preferably be arranged on the inner side of the housing part in the region of the recess at a distance of 1 mm to 1.8 mm, preferably 1 mm to 1.5 mm, particularly preferably 1.2 mm or 1.1 mm from the second annular edge and the second projection can extend over this distance. The second projection can extend continuously from the second annular edge to the height transition.

Such an arrangement of the projections or steps or ramps can be particularly advantageous for the reliable positioning of the spring plates within the recess or the housing with regard to customary operating parameters of the clamping device, on the one hand, and the simple insertion of the spring plates into the housing parts, on the other hand.

The distance between the first projection and the first stop and the distance between the second projection and the second stop can each be 1 mm to 1.5 mm, 1.1 mm to 1.4 mm, preferably 1.2 mm, which is particularly adapted for an effective latching of springs with customary thicknesses and customary rubber coatings.

If this brief description of the disclosure describes features which are not listed in the claims, these features do not constitute essential features in the sense that these features are necessarily to be included in the claims, but these features are particularly prominent preferred implementations of the claimed invention, can be combined with each of the claims and can also be combined with one another as desired.

BRIEF DESCRIPTION OF THE FIGURES

FIGS. 6A to 6B each show, in the lower region of the respective figure, a variant according to the invention of a housing part taken from FIG. 5A.

Components which are represented in a plurality of figures bear the same reference signs.

DETAILED DESCRIPTION

The disclosure relates to a housing part for a pneumatic clamping and/or braking device and to a pneumatic clamping and/or braking device having a housing part according to the invention.

When reference is made in this document to the device "clamp" or "clamping device", to the "clamping force" or to the process of "clamping", the device of the "brake" or "braking device" or the "braking force" or the process of "braking" is likewise also comprised.

FIGS. 1A to 5A show schematic cross sections through such a pneumatic clamping device 10 according to the invention having a housing 3 which comprises two housing parts 3a, 3b according to the invention, and having a spring 1 which is arranged in the housing 3 and comprises at least two annular spring plates 1a, 1b.

The clamping device 10 according to the invention comprises the following: a housing 3 comprising first and second housing parts 3a, 3b according to the invention, as described further below in the context of FIGS. 6A and 6B, wherein the two housing parts 3a, 3b are arranged with respect to one another and fastened to one another in such a way that recesses of the first and second housing parts 3a, 3b together form an inner space 13 within the housing 3; a spring 1 which is arranged in the inner space 13 and comprises a first annular spring plate 1a and a second annular spring plate 1b, wherein the spring plates 1a, 1b are arranged within the inner space 13 in such a way that at least one pressure space 2, 4 is formed in the inner space 13 and is delimited at least partially by the spring plates 1a, 1b, wherein the pressure space 2, 4 can be ventilated or vented (by means of an opening I, II and optionally connection to a compressed air pump 6) and can be subjected to positive pressure of a pressure medium which can be supplied to the housing 3, wherein the first spring plate 1a is clamped between the first contact surface 101 of the first housing part 3a and the second contact surface 102 of the first housing part 3a in such a way that a first end of the first spring plate 1 a is latched by the first latching means 110 of the first housing part 3a and a second end of the first spring plate 1a is latched by the second latching means 120 of the first housing part 3a; wherein the second spring plate 1b is clamped between the first contact surface 101 of the second housing part 3b and the second contact surface 102 of the second housing part 3b in such a way that a first end of the second spring plate 1b is latched by the first latching means 110 of the second housing part 3b and a second end of the second spring plate 1b is latched by the second latching means 120 of the second housing part 3b, and wherein the spring plates 1a, 1b are arranged relative to the at least one pressure space 2, 4 in such a way that, by ventilating or venting the pressure space 2, 4 or subjecting the pressure space 2, 4 to positive pressure, a bending of at least one of the spring plates 1a, 1b can be changed and as a result the device 10 changes between an open state, in which the object 5 is not touched by one or any of the clamping surfaces 7 but is spaced apart from the clamping surfaces 7, and a closed state, in which one or more of the clamping surfaces 7 transmit a clamping and/or braking force to the object 5. For example, the device 10 can change from the closed state to the open state or vice versa.

FIGS. 1A, 1B, 4A and 4B each show such clamping devices 10 in the closed state in that the clamping surface 7 of the clamping element 8 touches the circumference of the object 5. The clamping element 8 is also referred to as a clamping lip. The clamping element 8 can be formed in one piece with the other parts of the housing part 3a, 3b or can be a component of the housing part 3a, 3b which is structurally separated from the other parts.

Figure 1A:
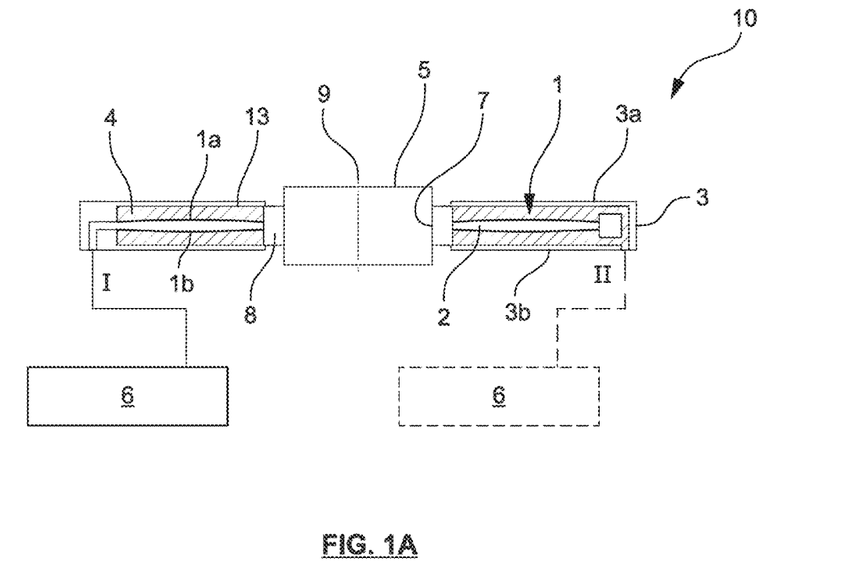
FIG. 1A shows a schematic cross section through an inwardly directed, passive pneumatic clamping and/or braking device according to the invention in the closed state.
Figure 1B:
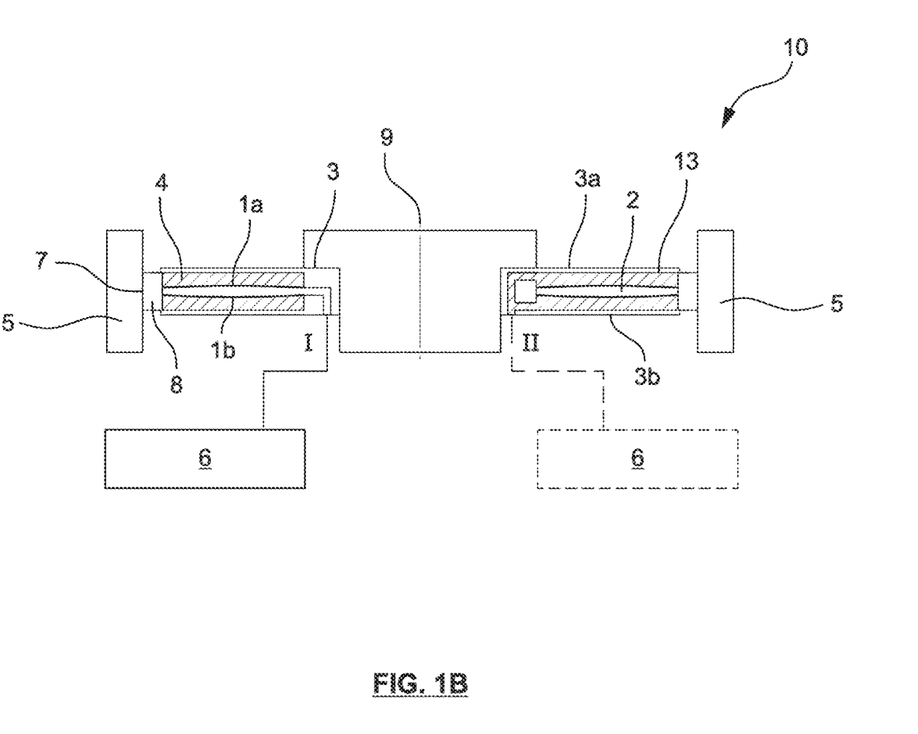
FIG. 1B shows a schematic cross section through an outwardly directed, passive pneumatic clamping and/or braking device according to the invention in the closed state.
Figure 4A:
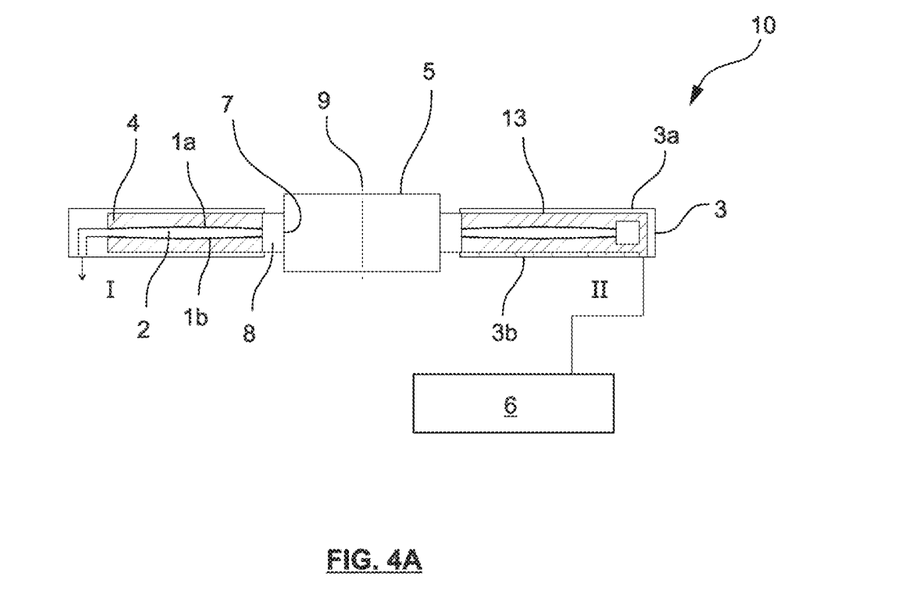
FIG. 4A shows a schematic cross section through an inwardly directed, active pneumatic clamping and/or braking device according to the invention in the closed state.
Figure 4B:
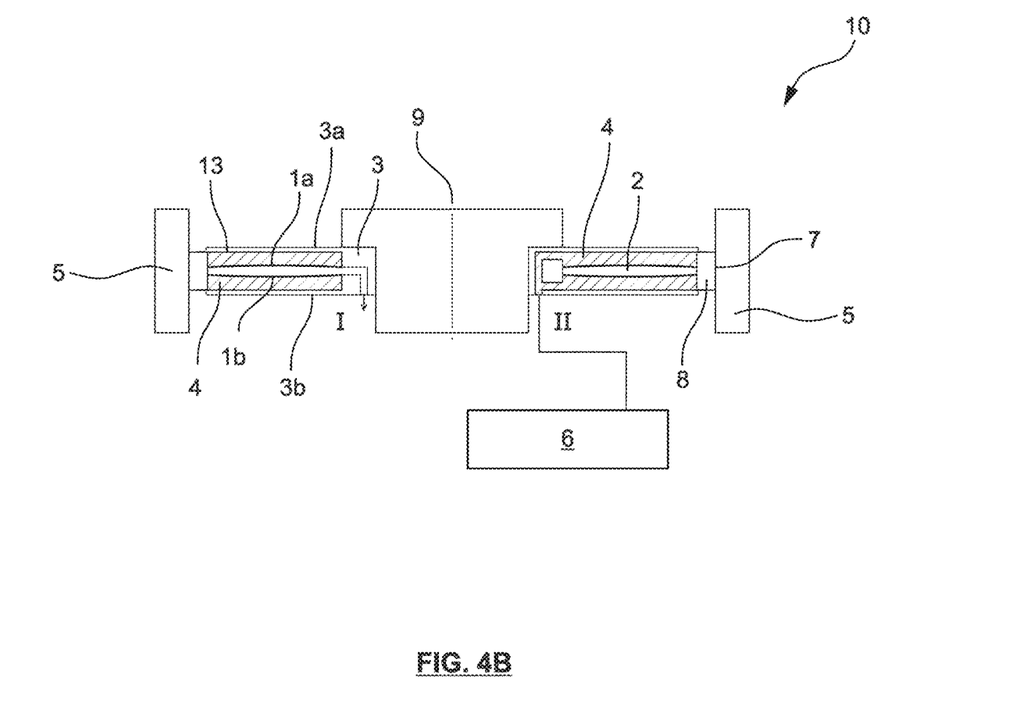
FIG. 4B shows a schematic cross section through an outwardly directed, active pneumatic clamping and/or braking device according to the invention in the closed state.
Figures 5A, 5B, 5C, 5D:
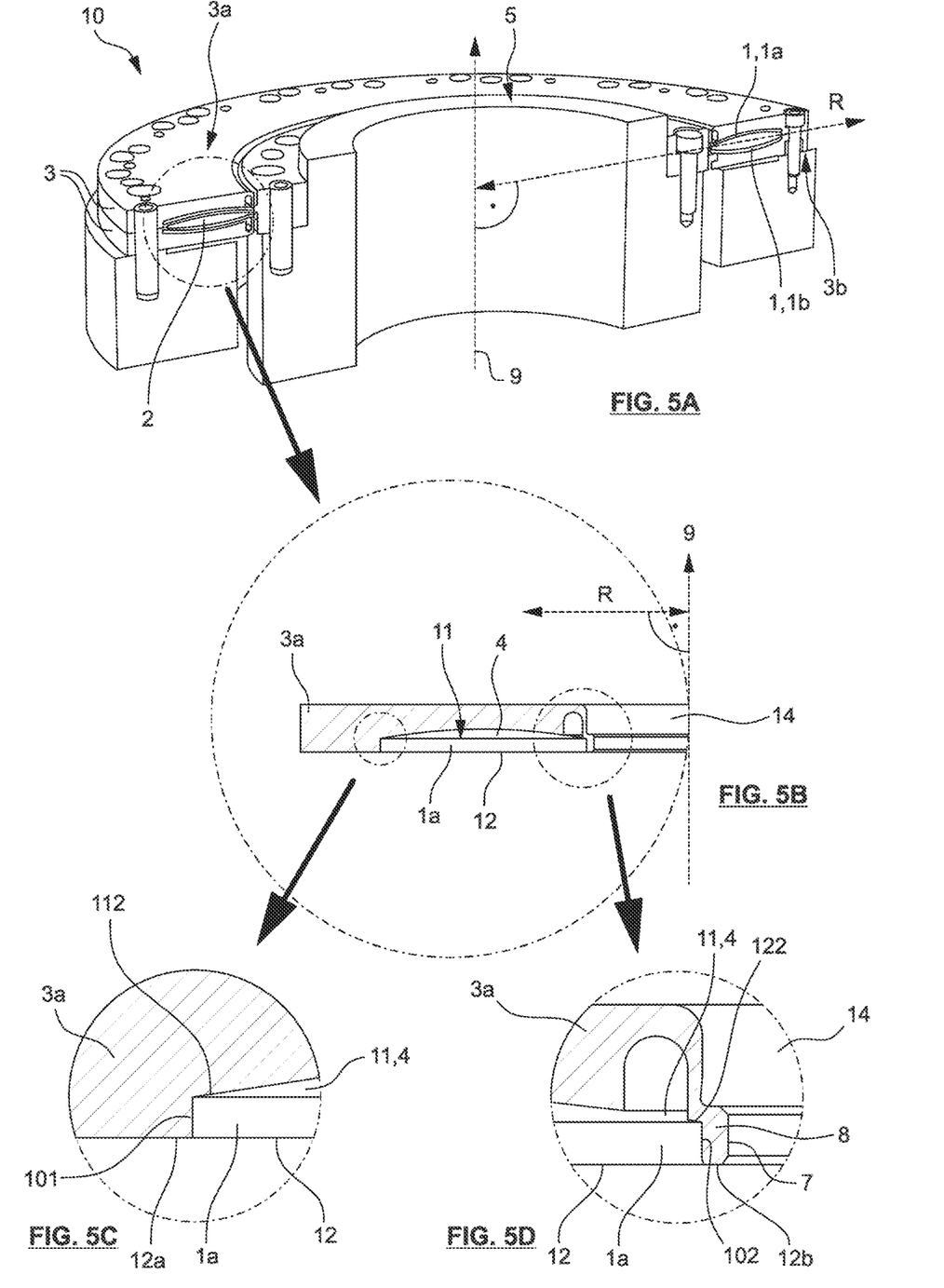
FIG. 5A shows a cross section through an inventive pneumatic clamping and/or braking device in a three-dimensional representation.
FIGS. 5B to 5D show a variant of a housing part according to the prior art taken from FIG. 5A.

The clamping force or effect of the clamping surface 7 on the object 5 to be clamped takes place in a clamping plane which is spanned by two vectors which each form a radius of the annular spring plates 1a, 1b or annular recess 11 (cf. FIG. 5A). The axis 9 can be referred to as the main axis of the clamping device 10 which runs perpendicular to the clamping plane. The clamping device 10 can be configured rotationally symmetrically about this main axis 9. The main axis 9 can run approximately or precisely centrally through an opening of the clamping device 10 (opening 14 in FIG. 5B). In FIGS. 1A, 4A, the object 5 to be clamped, for example a rotatable shaft of a machine or a table, is placed within the opening 14 and the clamping force of the clamping device is therefore directed radially inward toward the main axis 9 (perpendicular to the main axis 9) within the clamping plane. In FIGS. 1B, 4B, the object 5 to be clamped is placed outside the clamping device 10 and the clamping force of the clamping device is therefore directed radially outward away from the main axis 9 (perpendicular to the main axis 9) within the clamping plane.

In FIGS. 1A, 2A, 3A, 4A, the clamping element 8 is located between spring 1 and opening 14 or main axis 9. In FIGS. 1B, 2B, 3B, 4B, in contrast, the object 5 to be clamped at least partially surrounds the clamping device 10, such that the clamping element 8 is located there between object 5 and opening 14 or main axis 9. In FIGS. 1B, 2B, 3B, 4B, instead of the object 5 to be clamped, a component which at least partially fills the opening 14 and through which the main axis 9 extends can be introduced into opening 14.

In FIGS. 1A to 5A, in each case the spring 1 is clamped between two contact surfaces (101 and 102 in FIGS. 5C and 5D) within the housing 3 of the clamping devices 10 and extends between the two contact surfaces. In the pressureless initial state of the device 10 in FIGS. 1A to 2B, the spring 1 can be slightly bent in order to be fixed fixedly in the housing 3 in this state and the same can apply to any other state of the device 10, wherein the degree of bending of the spring 1 depends on the state in which the device 10 is located. If the device 10 is in a state in which the spring 1 is bent (e.g. more strongly bent than in the pressureless initial state, such as in the open state), venting of an inner pressure space 2 of the spring 1 and ventilation of an outer pressure space 4 can lead to the at least partial relaxation of the spring 1 while the spring 1 presses against the radial contact surfaces, the spacing of which increases somewhat, such that the housing 3 is elastically deformed in the region of the clamping element 8 or the clamping surface 7 and the clamping surface 7 thereby touches the object 5 and is pressed against the object 5 with a (predefined) clamping force in order to clamp the object 5. The object 5 is clamped and the clamping device 10 is in the closed state, as shown in FIGS. 1A and 1B. In the closed state of the device 10, the spring 1 can still be slightly bent even after the partial relaxation in order to be fixed fixedly in the housing 3 in this state.

The clamping element 8 can be an elastic element, such as a spring fork, which, in the pressureless initial state of the device 10, is brought by the spring force of the (slightly) bent spring 1 from an initial position, in which the elastic element is relaxed, into a tensioned position, for example by bending the spring fork 8, until an equilibrium between a restoring force of the elastic element 8 and the spring force of the spring 1 arises in the pressureless initial state. With this equilibrium, the clamping surface 7 can press against the object 5.

By additionally applying compressed air (for example at 4 bar or 6 bar) to the outer pressure space 4 in the closed state, there is the optional possibility of increasing the clamping force by a predetermined value. This is indicated in FIGS. 1A, 1B by the optional additional compressed air pump (booster) 6 and the hatching (compressed air) in the outer pressure space 4. The outer pressure space 4 can be connected by means of an opening in the housing 3 to an air connection II (also referred to as "close"), to which the compressed air pump 6 can be connected.

This makes it possible, for example, to actuate the device 10 in such a way that a change takes place between a (in the pressureless state) braked movement of the charged object 5 and complete clamping of the object (in the case of sufficient pressure application).

Even if two pressure spaces 2, 4 are shown and described here by way of example, the clamping device 10 can also be operated with a single pressure space, which can be, for example, the inner pressure space 2 or the outer pressure space 4.

Figure 2A:
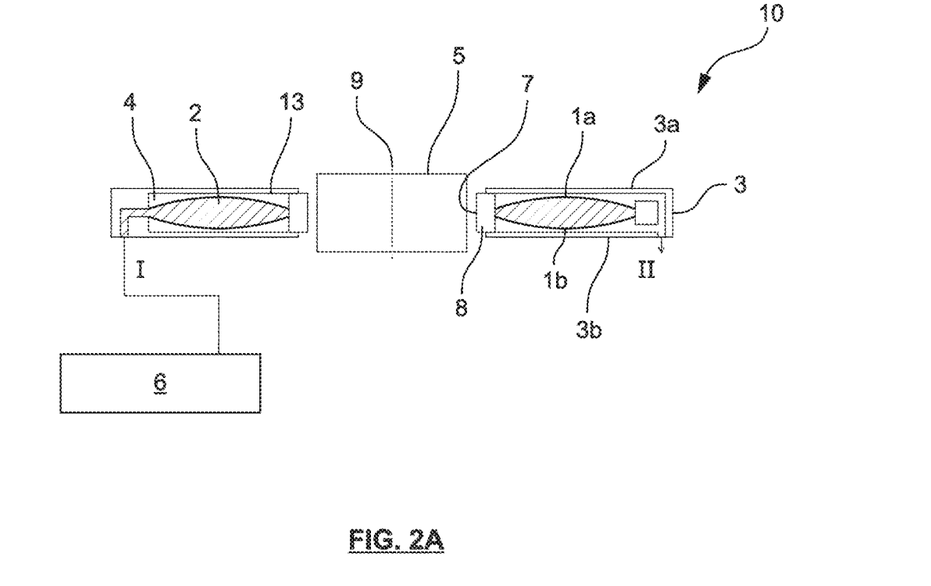
FIG. 2A shows a schematic cross section through an inwardly directed, passive pneumatic clamping and/or braking device according to the invention in the open state.
Figure 2B:
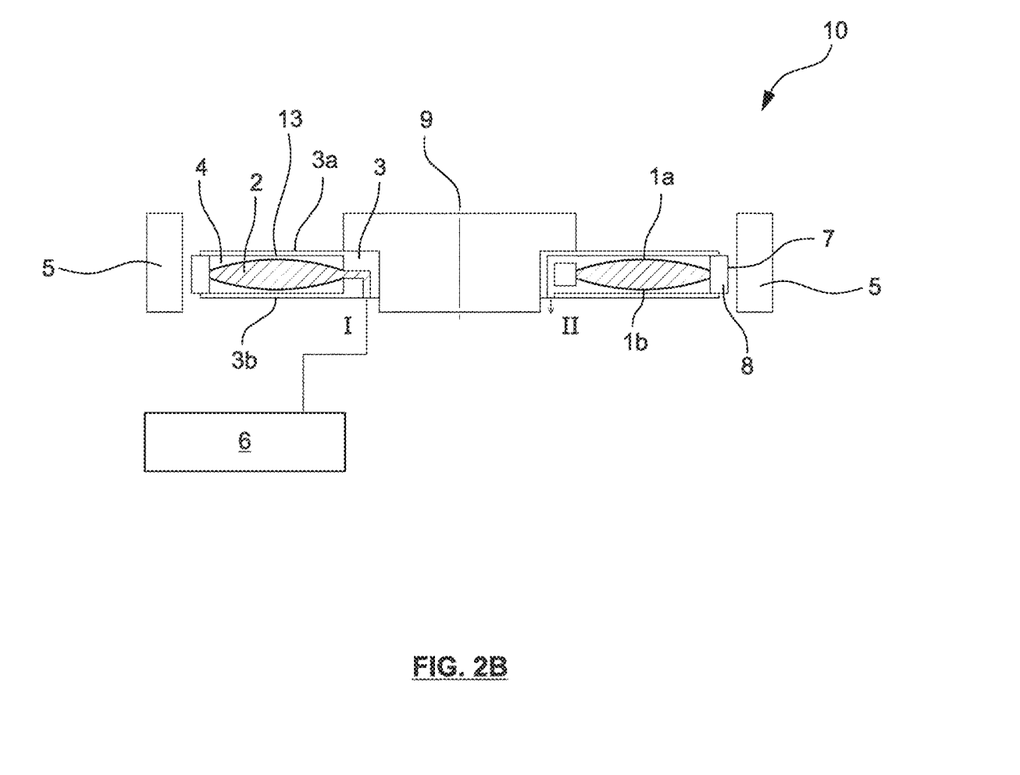
FIG. 2B shows a schematic cross section through an outwardly directed, passive pneumatic clamping and/or braking device according to the invention in the open state.
Figure 3A:
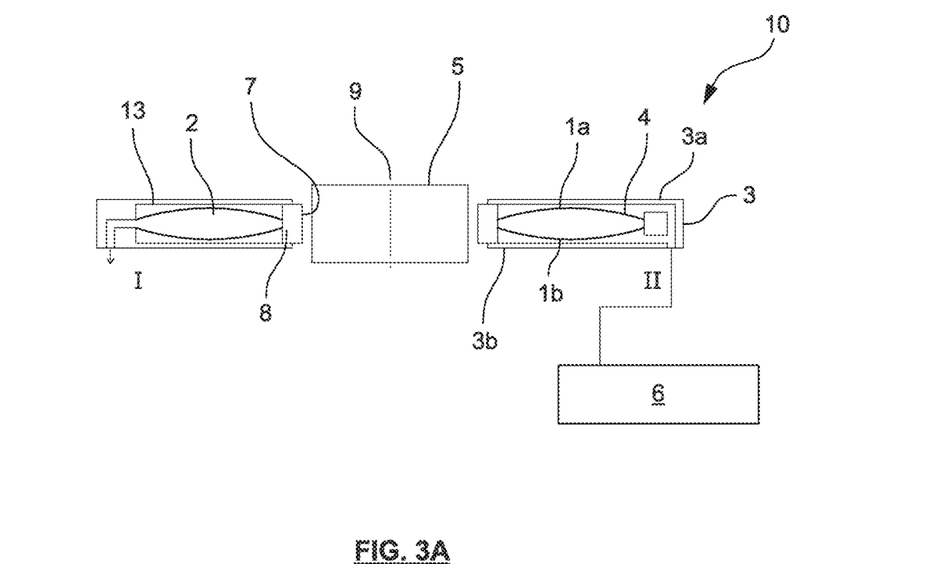
FIG. 3A shows a schematic cross section through an inwardly directed, active pneumatic clamping and/or braking device according to the invention in the open state.
Figure 3B:
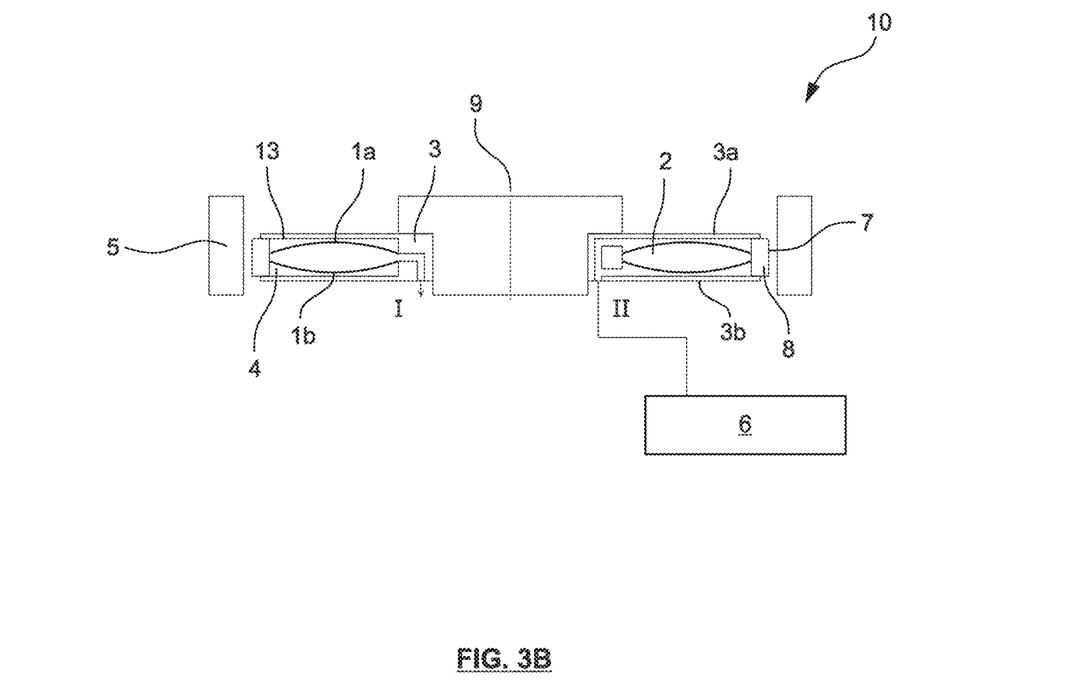
FIG. 3B shows a schematic cross section through an outwardly directed, active pneumatic clamping and/or braking device according to the invention in the open state.

FIGS. 2A and 2B show the clamping devices 10 from FIGS. 1A and 1B each in the open state in which the clamping surface 7 does not touch the circumference of the object 5 or is spaced apart from the circumference of the object 5. The inner pressure space 2 can be connected by means of an opening in the housing 3 to an air connection I (also referred to as "open"), to which a compressed air pump 6 can be connected.

By applying compressed air (for example 4 bar or 6 bar) to the inner pressure space 2 by the compressed air pump 6 and venting the outer pressure space 4, the spring 1, compared with the closed state from FIGS. 1A, 1B, is bent or tensioned more strongly (convexly) and there is a radial shortening of the spring 1 or of the distance between the two contact surfaces. The clamping surface 7 lifts off from the object 5 in order to cancel the clamping. The object 5 is freely movable (e.g. rotatable about axis 9 or linearly movable along axis 9) and the clamping device 10 is open.

It is possible to change back and forth between the closed state and the open state of the device 10.

Such pneumatic clamps 10 have a number of advantages over hydraulic clamps.

By using the combination of elastic component, in this case a spring 1 together with spring plates 1a, 1b, and compressed air, for example very short reaction times are achieved when switching between the open and closed state and a secure clamping of the object 5 is likewise brought about. The spring 1 can preferably be of plate-shaped configuration, as shown in more detail in FIG. 5, wherein two spring plates 1a, 1b lying one on top of the other form the spring 1 and the inner pressure space 2 of the spring 1 between the plates 1a, 1b. The plates 1a, 1b can likewise be annular, as shown in FIG. 5, and can optionally additionally have radial slots, such that a change in the inner diameter is possible with particularly low forces. The spring plates 1a, 1b can be coated with rubber, at least in the region of slots, in order to produce the sealing required for the compressed air. The spring plates 1a, 1b can also be completely sheathed with rubber. The spring plates 1a, 1b are generally designed to be so pressure-resistant and so elastically bendable and are arranged in the housing 3 of the clamping device 10 in such a way that the inner pressure space 2 is formed within the spring 1 between the spring plates 1a, 1b and the outer pressure space 4 is formed between each spring plate 1a, 1b and the housing 3 or the housing parts 3a, 3b of the clamping device 10. FIG. 5 shows a three-dimensional view of a clamping device 10 similarly to FIGS. 1A and 2A.

By venting or charging with compressed air the outer pressure space 4 and venting the inner pressure space 2, as shown in FIG. 1A, the spring 1 is at least partially relaxed and brings about a clamping force on the object 5 to be clamped, in particular on the circumference of a shaft 5. As a result, in the event of energy or pressure failure, the object 5 is clamped or the shaft 5 is immediately brought to a standstill and therefore offers a safety clamping. Depending on the size, such pneumatic clamps 10 can achieve holding torques of several 100 Nm and up to several 1000 Nm, which can be increased further by additionally charging the outer pressure space 4 with compressed air, as indicated in FIG. 1A by a pressure pump 6 (booster). Here, a compressed air of a few bar (for example 4 bar or 6 bar) is sufficient to provide a multiple of the holding torques which are achieved without a booster. In this case, the fact is used that small transverse bending of the plates 1a, 1b (perpendicular to their longitudinal axis) generate large spring forces when switching between the open and closed state of the clamp 10, which can be used for clamping or for releasing prestressed clamping devices 10. As a result, secure clamping and release of rapidly rotating machine shafts 5 is also made possible.

In the case of pneumatic material, the costs and the assembly outlay are also lower than in the case of hydraulic material and no additional outlay for producing cleanliness on the system arises by using compressed air. Such pneumatic clamps also allow a small overall size, since a small transverse bending and a small (changes in) longitudinal extent of the spring, and as a result small volumes of the pressure spaces, are sufficient to apply the required clamping forces.

In the case of pneumatic clamps, a distinction is made in principle between passive clamping devices 10, as shown in FIGS. 1A to 2B, and active clamping devices 10, as shown in FIGS. 3A to 4B.

In the pressureless initial state, the spring 1 can be bent to different extents (transversely) and can therefore be shortened radially to different extents. The inner side of the housing 3 can be adapted to the bending of the spring plates 1a, 1b or define the latter. A corresponding stop surface for the spring plates 1a, 1b can be formed for example by a housing inner wall. The housing inner wall can be designed to be complementary (for example concave) to a (for example convex) bending of the spring plates 1a, 1b.

In the case of passive clamping devices 10, in the pressureless initial state, the spring 1 is generally bent slightly elastically (for example convexly) or is prestressed and the clamping devices 10 can be closed (FIGS. 1A, 1B). The clamping device 10 is opened only by the action of force from the inside via application of compressed air to the inner pressure space 2 (FIGS. 2A, 2B). Usually, the spring 1 is bent somewhat in the pressureless initial state, with the result that, in the case of clamping or in the case of a pressure drop, the spring force given by the energy stored in the spring 1 is transmitted to the object 5 to be clamped as a clamping force in order to clamp the object 5.

In the case of active clamping devices 10, in the pressureless initial state (FIGS. 3A, 3B), the spring 1 is curved more strongly, in particular more convexly, transversely outward than in the case of passive clamping devices, with the result that the distance between the two radial contact surfaces is shortened and the clamping device 10 is opened. No clamping force is brought about on the object 5 via the clamping surface 7. The object is free since the clamping surface 7 does not touch the object 5 or is spaced apart from the object 5.

As a result of plastic deformation of the spring plates 1a, 1b, the spring 1 can be curved more strongly transversely outward in the same housing 3 in the pressureless initial state and can therefore be shortened more strongly radially than in the case of passive clamping devices. This smaller radial extent of the spring plates 1a, 1b in the pressureless initial state can lead to an open state of the clamping device 10 in the pressureless initial state. Even in the case of plastic deformation, the spring plates 1a, 1b are elastically bent and press against the contact surfaces, with the result that the spring is fixed in the housing. The interior of the housing or the recesses can accommodate the curvature brought about more strongly by plastic deformation in the initial state.

The clamping force must now be actively induced from the outside, as shown in FIGS. 4A and 4B, in order to transfer the clamp into the closed state. Here, compressed air is introduced into the outer pressure space 4 by a compressed air pump 6 and therefore the spring 1 is charged with compressed air from the outside in such a way that the spring 1 is actively relaxed, the curvature of the spring 1 is reduced, the distance between the two contact surfaces is increased, and the housing 3 is elastically deformed in the region of the clamping element 8 or the clamping surface 7, such that the clamping surface 7 touches the object 5 and brings about a clamping force on the object 5 and the object 5 is thereby clamped. The active clamping device is then in the closed state.

Depending on the field of application and prescribed safety regulations, use is therefore made of an active or passive clamping system 10. If primarily a safety clamping is desired, a passive clamping device is generally used. With such pneumatic passive clamping systems, it is possible, even in the pressureless state, during corresponding assembly of the device in an overall device, to generate a predetermined clamping force with which the object 5 to be clamped is charged. As a result of the application of positive pressure or negative pressure, the forces transmitted to this object can be increased, reduced or completely eliminated, which opens up diverse applications. If, in contrast, a deliberate work operation, such as a tool change, is to be carried out primarily with the clamping device, an active clamping device is generally used.

As represented in FIG. 5A, the housing 3 of the clamping devices 10 according to the invention comprises two housing parts 3a, 3b according to the invention which are fastened to one another with fastening means, such as screws, and are mounted such that, in the mounted state, the two housing parts 3a, 3b define an interior 13 between the housing parts 3a, b within the housing 3 in which the spring 1 together with the annular spring plates 1a, 1b thereof are arranged. The housing parts 3a, 3b each define a recess 11 which is likewise annular and which serves to receive the annular spring plates 1a, 1b, as represented in FIGS. 5A, 5B. At least part of the first contact surface 101 can run (substantially) perpendicular to the radial direction R of the annular recess 11 and/or part of the second contact surface 102 can run (substantially perpendicular) to the radial direction R of the annular recess 11.

An opening 14 (FIG. 5B) into which the object 5 to be clamped, such as a shaft, can be introduced extends through the center of the housing 3. The housing can extend up to 360° around this opening and at least partially surrounds the object 5 in at least one plane which is referred to as the clamping plane. The central main axis 9 of the clamping devices runs centrally through the opening 14 and perpendicular to the clamping plane. In clamping devices according to FIGS. 1A, 2A, 3A, 4A, 5A, the main axis 9 runs centrally through the shaft along its longitudinal axis.

Along the circumference of the housing 3 or the opening 14 there is located one or more of the clamping surfaces 7 which, in the case of elastic deformation of the housing 3 in the region of the clamping element 8 or the clamping surface 7, brings about the clamping force on the outer circumference of the object 5 and can thereby clamp the object 5. For effective opening and closing of the clamping device 10 with respect to the object 5 to be clamped, without the risk of damage to the object 5, a symmetrical distribution of the clamping force along the clamping surface 7 or along the circumference of the object 5 is desirable. A non-symmetrical distribution of the clamping force can lead to damage to the object 5. One or both contact surfaces 101, 102 are preferably of circular configuration within the clamping plane. The clamping surface 7 is preferably of circular configuration within the clamping plane. The clamping element 8 can be of annular configuration. All annular or circular components described herein can each have, individually or in combination, the point of intersection of the main axis 9 with the clamping plane (e.g. centre point of the opening 14) as centre point.

FIG. 5B shows one of the two housing parts 3a (here the upper housing part 3a from FIG. 5A), and one of the two spring plates 1a, 1b of the spring 1. The represented spring plate 1a of the spring 1 extends from a first contact surface 101 within the housing part 3a to a second contact surface 102 within the housing part 3a and can touch the latter. The first contact surface 101 is in this case arranged radially further outside than the second contact surface 102 as viewed from the centre point of the opening 14.

FIG. 5C shows the section of the housing part 3a represented in FIG. 5B in which the upper plate 1a of the spring 1 meets the first contact surface 101 and is preferably in contact with the latter. FIG. 5D shows the section of the housing part 3a represented in FIG. 5B in which the upper plate 1a of the spring 1 meets the second contact surface 102 and is preferably in contact with the latter. However, it is also possible that one or more further components, via which the spring plate 1a exerts its spring force on the contact surfaces 101, 102, to be located radially between the spring plate 1a and one or more of the contact surfaces 101, 102.

The housing part 3a represented in FIGS. 5B to 5D has in this case the shape previously used in the prior art. As can be seen in FIGS. 5B, 5D, the inner sides of the housing part 3a between which the spring plate 1a is clamped in the recess are of rectilinear or planar configuration. Each of the plates of the spring 1 is introduced in the direction of the main axis 9 of the clamping devices 10 through the opening 12 into the recess 11 of the respectively associated housing part during mounting along rectilinear or planar inner surfaces of the housing part 3a until the respective plate at the end of each of the two contact surfaces 101, 102 abuts against a stop 112, 122 and therefore cannot be introduced further into the recess 11. Since the extent of the spring plate 1a in the clamping plane or in the radial direction of the annular recess is greater than the extent of the interior defined by the housing part, the plate 1a is bent or prestressed in the pressureless initial state.

However, it has been found that the plates 1a, 1b of the spring 1 are positioned during assembly as a function of the axial press-in force and are therefore not always positioned axially in the same manner in the housing parts 3a, 3b. The spring plates 1a, 1b can tilt, be introduced to different depths into the housing parts or bend to different extents. The variation in the positioning of the plates 1a, 1b within the housing parts results, by virtue of the decisive importance thereof for the opening and closing function of the clamping devices 10, in a variation in these functions, in particular an asymmetry in the distribution of the clamping force along the clamping surface or the circumference of the opening within the clamping plane, which is disadvantageous for an effective and durable clamping action and an intact object.

Figure 6A:
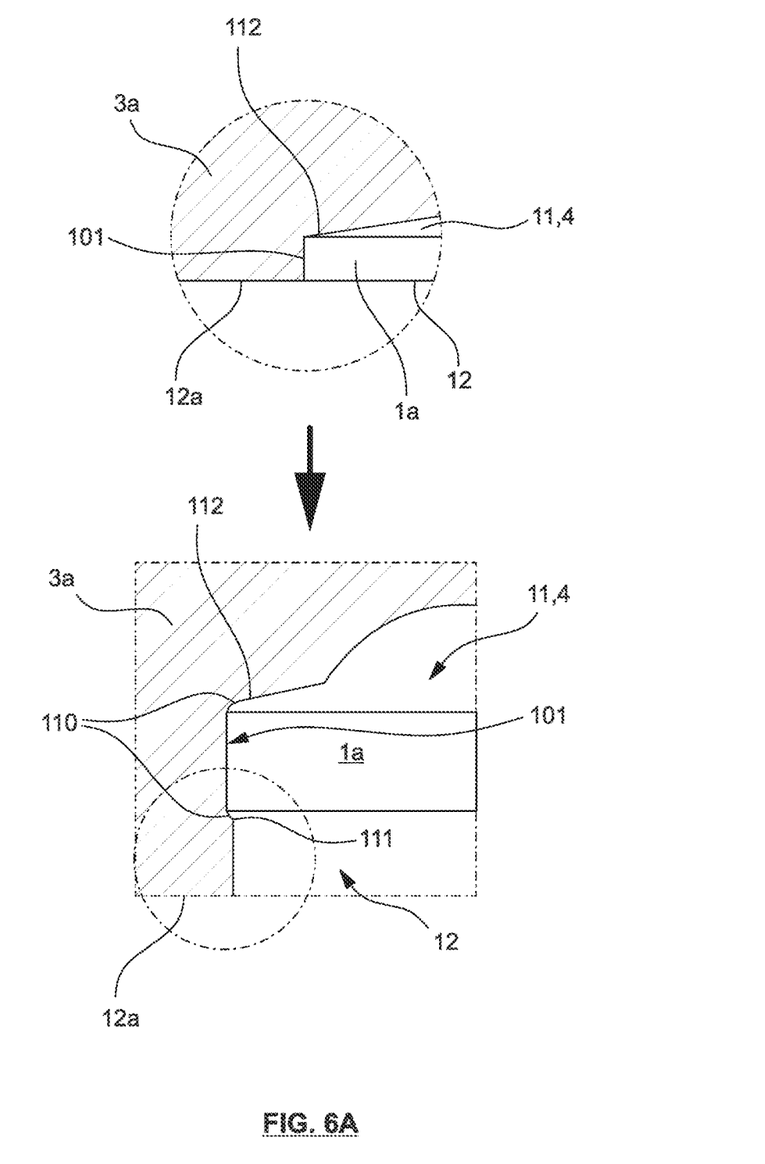
FIGS. 6A to 6B each show, in the upper region of the respective figure, the variants of the housing part according to the prior art as represented in FIGS. 5B to 5D.
Figure 6B:
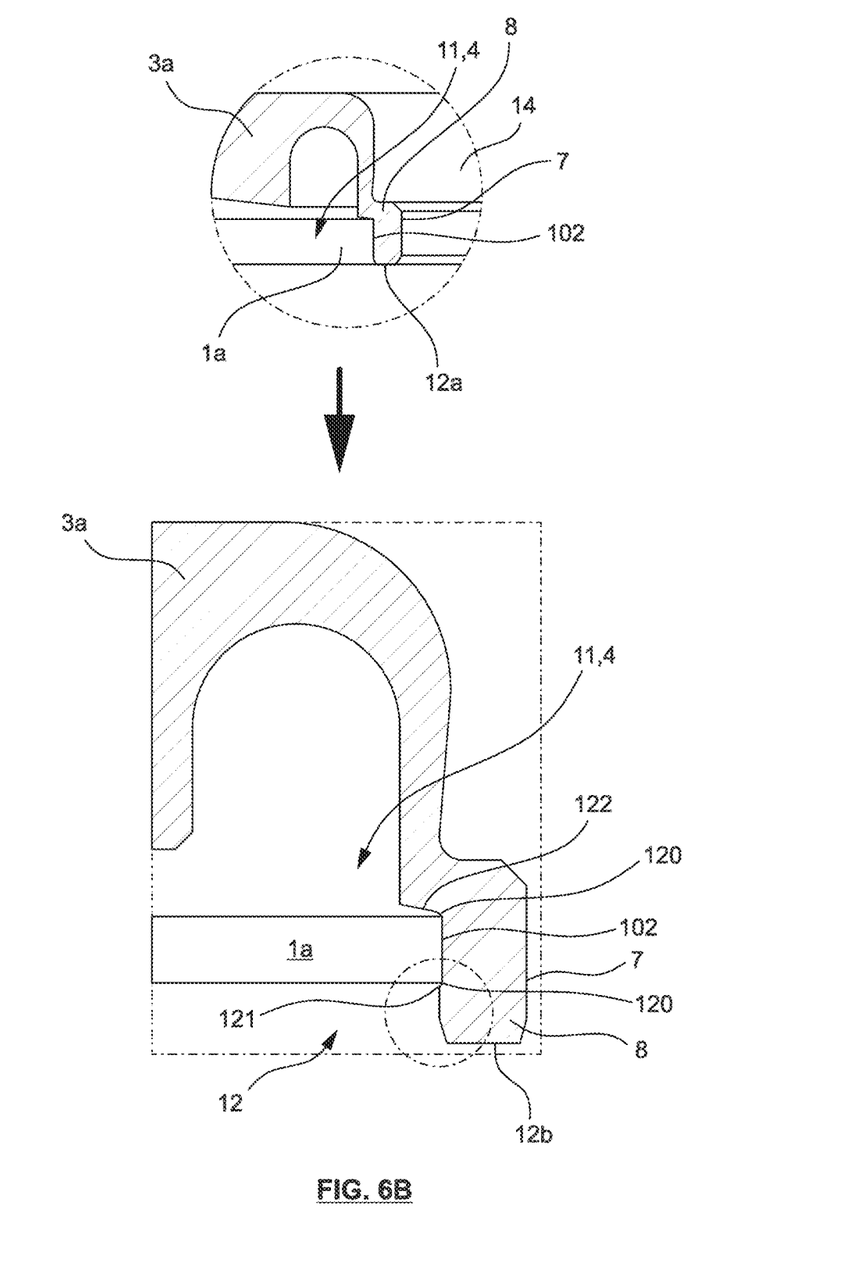

Housing parts 3a, 3b according to the invention are represented in the lower drawings of FIGS. 6A and 6B in comparison with the conventional housing parts according to FIGS. 5C, 5D, wherein the latter are represented once again in the upper drawings of FIGS. 6A and 6B for comparison.

The housing part 3a, 3b according to the invention comprises: an annular recess 11 for clamping an annular spring plate 1a, 1b between a first contact surface 101, defined by the recess 11, of the housing part 3a, 3b and a second contact surface 102, defined by the recess 11, of the housing part 3a, 3b; a clamping element 8 with a clamping surface 7 which is designed, when the spring plate 1a, 1b is clamped in the recess 11 between the first contact surface 101 and the second contact surface 102 in such a way that a first end of the spring plate 1a, 1b is supported on the first contact surface 101, the spring plate 1a, 1b extends from the first contact surface 101 to the second contact surface 102, and a second end of the spring plate 1a, 1b presses on the second contact surface 102, to transmit a clamping and/or braking force to an object 5 to be clamped and/or braked; wherein the housing part 3a, 3b comprises a first latching means 110 and a second latching means 120, wherein, when the spring plate 1a, 1b is clamped in the recess 11 between the first contact surface 101 and the second contact surface 102, the first latching means 110 is designed to latch the first end of the spring plate 1a, 1b on the first contact surface 101 and the second latching means 120 is designed to latch the second end of the spring plate 1a, 1b on the second contact surface 102.

As represented in the lower drawing of FIG. 6A, a projection 111 which delimits the first contact surface 101 is preferably provided according to the invention as part of the first latching means. When the plate 1a is inserted into the housing part 3a along a direction parallel to the main axis 9, the first end of the spring plate 1a therefore has to overcome this projection 111, but this leads to the plate 1a being arranged in a defined manner between the stop 112 and the projection 111 in the direction of the main axis 9 after this projection 111 has been overcome. The plate 1a latches in between stop 112 and projection 111 in the region of the first contact surface 101 and can preferably touch the latter there. The projection 111 can be step-shaped or ramp-shaped or have a different shape which provides this function of the projection. The same applies analogously to the second contact surface 102 according to the invention represented in the lower image of FIG. 6B, which is likewise preferably delimited by a projection 121 which the second end of the spring plate 1a has to overcome during insertion along a direction parallel to the main axis 9 before the plate 1a is positioned in a defined manner between the stop 122 and the projection 121 and latches in there in the region of the second contact surface 102. The second end of the spring plate 1a can preferably touch the second contact surface 102 during the latching. The projection 121 can be step-shaped or ramp-shaped or have a different shape which provides this function of the projection 121.

As can be seen from FIGS. 1A to 6B, the first projection 111 and the first stop are further away from the object 5 to be clamped than the second projection 121 and the second stop 122, specifically independently of whether the clamping force acts inward (FIGS. 1A, 2A) or outward (FIGS. 1B, 2B). First projection 111 and first stop 112 can be arranged opposite the clamping element 8 in the housing part 3a, 3b, while second projection 121 and second stop 122 are arranged in the region of the clamping element 8 or can be part of the clamping element 8. The first stop 112 can have a longer extent in the radial direction R of the annular recess 11 than the first projection 111 (FIGS. 6A, 5B). The first projection 111 can project by 0.025 mm to 0.15 mm, preferably 0.05 mm to 0.1 mm, particularly preferably by 0.1 mm, in a radial direction R of the annular recess 11 from or with respect to the first contact surface 101 (e.g. into the recess 11).

The second stop 122 can have a longer extent in the radial direction R of the annular recess 11 than the second projection 121 (FIGS. 6B, 5B). The second projection 121 can project by 0.025 mm to 0.15 mm, preferably 0.05 mm to 0.1 mm, particularly preferably by 0.05 mm, in a radial direction R of the annular recess 11 from or with respect to the second contact surface 102 (e.g. into the recess 11).

The annular recess 11 can define an annular opening 12 in the housing part 3a, 3b (in the clamping plane), wherein the annular opening 12 is formed between a first annular edge 12a of the housing part and a second annular edge 12b of the housing part, and wherein the annular opening 12 serves to insert the spring plate 1a into the recess 11. The first projection 111 can be arranged between the first annular edge 12a and the first contact surface 101 on an inner side of the housing part 3a in the region of the recess 11 and can project into the recess 11. The second projection 121 can be arranged between the second annular edge 12b and the second contact surface 102 on an inner side of the housing part in the region of the recess 11 and can project into the recess 11 (FIGS. 6A, 6B).

Projection 111 and stop 112 can define a groove in the housing part 3a, into which the first end of the spring plate 1a can latch, wherein the first contact surface 101 can form part of the groove. Projection 121 and stop 122 can define a groove in the housing part 3a, into which the second end of the spring plate 1a can latch, wherein the second contact surface 102 can form part of the groove.

The distance between the step or ramp of the first projection 111 and first edge 12a can be 1 mm to 1.8 mm, 1.1 mm to 1.5 mm, preferably 1.2 mm or 1.1 mm. The distance between the step or ramp of the second projection 121 and the second edge 12b can be 1 mm to 1.8 mm, 1.1 mm to 1.5 mm, preferably 1.2 mm or 1.1 mm.

The distance between first projection 111 and first stop 112 and the distance between second projection 121 and second stop 122 can each be 1 mm to 1.5 mm, 1.1 mm to 1.4 mm, preferably 1.2 mm.

By creating the latching means 110, 120, preferably by means of projections 111, 121, optionally in combination with the optional stops 112, 122, in the regions of the two contact surfaces 101, 102, an (in particular axial) forced position is created for the spring plate 1a, 1a. As a result of this forced positioning, the spring plate 1a, 1b is mounted in a stable manner, in particular positioned axially in a defined manner in the direction parallel to the main axis 9 of the clamping device 10, and the position of the spring plate 1a, 1b is therefore no longer decisively positioned within the housing parts 3a, 3b as a function of the axial press-in force. As a result of the (axially) clearly defined position of each of the spring plates 1a, 1b of the spring 1, the curvature of the spring plates 1a, 1b is also configured in a well-defined manner and as desired in the pressureless state.

As a result of the latching means 110, 120, the two spring plates 1a, 1b in the clamping device 10 can also be arranged at a well-defined uniform distance from one another within the housing 3. The spring plates 1a, 1b can be positioned by the latching means 110, 120 with their longitudinal axes parallel to the clamping plane. The symmetrical functional structure achieved by the latching means 110, 120 generates symmetrical stresses of the spring 1 over the entire circumference of the opening 14 and thus leads to a very effective clamping force distribution uniformly around the object 5 in the clamping plane.

The opening and closing functions can thus take place symmetrically and reliably by the latching means 110, 120 over the circumference of the opening 14. Possible undesired radial or axial movements of the housing 3 thus do not lead to undesired axial or radial geometric displacements on the clamping surface 7.

The inventors have furthermore discovered that, as a result of these latching means 110, 120, in particular by the projections 111, 121, in addition to an axially well-defined and symmetrical positioning of the plates 1a, 1b of the spring 1 within the housing, an improved sealing effect between the spring plates 1a, 1b and between each of the two housing parts 3a, 3b with the associated plate 1a, 1b of the spring 1 is additionally also achieved. These improved sealing effects are of particular advantage in particular in the case of the additional application of compressed air to the inner and outer pressure spaces 2, 4 for transferring the clamping devices into another of the two states described. The latching means 110, 120, in particular the projections 111, 121, bring about an improved contact between the rubber coatings of the plates 1a, 1b and the rubber coating of each plate 1a, 1b with the respective housing part 3a, 3b with regard to the sealing effect.

The inventors have identified further additional advantages by creating the latching means 110, 120, in particular the projections 111, 121. Thus, the defined position of the rubberized spring plates 1a, 1b via the adaptation of the rubber thicknesses around the spring plates allows targeted stroke limitations of the plates to be installed as protection against incorrect applications (for example zero crossing) with excessively high operating pressure (in particular in the case of boosters) and likewise the air requirement (volume) of compressed air is reduced as a result and the opening and closing speeds of the clamping device 10 are increased as a consequence.

Preferred embodiments of the subjects claimed by the following claims are described in the description and in the figures. The optional features disclosed in the above description, the claims and the drawings can be used both individually and in any desired combination for the implementation of the subjects claimed here in accordance with the accompanying claims in their various configurations.

The various aspects and embodiments described above can be combined to create yet further embodiments. These and other changes can be made to the embodiments in light of the above detailed description. In general, the terms used in the following claims should not be construed as limiting the claims to the specific aspects and embodiments disclosed in the description and the claims, but should be construed as including all possible embodiments along with the full scope of equivalents to which these claims are entitled.

The invention claimed is:

1. A housing part for a pneumatic clamping and/or braking device, the housing part comprising:
   an annular recess for clamping an annular spring plate between a first contact surface of the housing part defined by the recess and a second contact surface of the housing part defined by the recess;
   a clamping element having a clamping surface which is designed, when the spring plate is clamped in the recess between the first contact surface and the second contact surface in such a way that a first end of the spring plate is supported on the first contact surface, the spring plate extends from the first contact surface to the second contact surface, and a second end of the spring plate presses on the second contact surface, to transmit a clamping and/or braking force to an object to be clamped and/or braked; and characterized in that the housing part comprises a first latching means and a second latching means, wherein, when the spring plate is clamped in the recess between the first contact surface and the second contact surface, the first latching means is designed to latch the first end of the spring plate on the first contact surface and the second latching means is designed to latch the second end of the spring plate on the second contact surface.

2. The housing part according to claim 1, characterized in that the first latching means is designed, in particular during operation of the clamping and/or braking device, to hold the first end of the spring plate in a predefined position with respect to the first contact surface and/or in that the second latching means is designed, in particular during operation of the clamping and/or braking device, to hold the second end of the spring plate in a predefined position with respect to the second contact surface.

3. The housing part according to claim 1, characterized in that the housing part is designed in such a way that, when the second end of the spring plate presses on the second contact surface, the housing part deforms elastically in the region of the clamping element and thereby the clamping surface transmits the clamping and/or braking force to the object to be clamped and/or braked.

4. The housing part according to claim 1, characterized in that the first latching means comprises a first projection and a first stop, which each delimit the first contact surface in such a way that the first latching means is designed to latch the first end of the spring plate between the first projection and the first stop in the region of the first contact surface.

5. The housing part according to claim 4, characterized in that the second latching means comprises a second projection and a second stop, which each delimit the second contact surface in such a way that the second latching means is designed to latch the second end of the spring plate between the second projection and the second stop in the region of the second contact surface.

6. The housing part according to claim 5, characterized in that the first projection comprises a step or ramp and/or in that the second projection comprises a step or ramp.

7. The housing part according to claim 4, characterized in that the first projection and the first stop are arranged and dimensioned in the region of the recess in such a way that, the spring plate having been introduced from the outside into the recess and the first end of the spring plate having passed the first projection, the first stop forms an obstacle to a deeper introduction of the first end of the spring plate into the recess.

8. The housing part according to claim 5, characterized in that the second projection and the second stop are arranged and dimensioned in the region of the recess in such a way that, the spring plate having been introduced from the outside into the recess and the second end of the spring plate having passed the second projection, the second stop forms an obstacle to a deeper introduction of the second end of the spring plate into the recess.

9. The housing part according to claim 5, characterized in that the first stop has a longer extent in a radial direction of the annular recess than the first projection and/or in that the second stop has a longer extent in the radial direction of the annular recess than the second projection.

10. The housing part according to claim 5, characterized in that the first projection projects into the recess by 0.025 mm to 0.15 mm with respect to the first contact surface in a radial direction of the annular recess and/or the second projection projects into the recess by 0.025 mm to 0.15 mm with respect to the second contact surface in a radial direction of the annular recess.

11. The housing part according to claim 5, characterized in that the annular recess defines an annular opening in the housing part, wherein the annular opening is formed between a first annular edge of the housing part and a second annular edge of the housing part.

12. The housing part according to claim 11, characterized in that the first projection is arranged between the first annular edge and the first contact surface on an inner side of the housing part in the region of the recess.

13. The housing part according to claim 11, characterized in that the second projection is arranged between the second annular edge and the second contact surface on an inner side of the housing part in the region of the recess.

14. The housing part according to claim 11, wherein the first projection extends from the first annular edge to the first contact surface.

15. The housing part according to claim 11, wherein the second projection extends from the second annular edge to the second contact surface.

16. The housing part according to claim 1, wherein the second contact surface and the clamping surface are arranged on mutually opposite side surfaces of the clamping element.

17. A clamping and/or braking device for clamping and/or braking an object to be clamped and/or braked, comprising:
a housing comprising a first housing part and a second housing part, the first housing part comprising:
a first annular recess for clamping a first annular spring plate between a first contact surface of the first housing part defined by the first recess and a second contact surface of the first housing part defined by the first recess;
a first clamping element having a first clamping surface which is designed, when the first spring plate is clamped in the first recess between the first contact surface of the first housing part and the second contact surface of the first housing part in such a way that a first end of the first spring plate is supported on the first contact surface of the first housing part, the first spring plate extends from the first contact surface of the first housing part to the second contact surface of the first housing part, and a second end of the first spring plate presses on the second contact surface of the first housing part, to transmit a first clamping and/or braking force to an object to be clamped and/or braked; and
a first latching means of the first housing part and a second latching means of the first housing part; and
the second housing part comprising:
a second annular recess for clamping a second annular spring plate between a first contact surface of the second housing part defined by the second recess and a second contact surface of the second housing part defined by the second recess;
a second clamping element having a second clamping surface which is designed, when the second spring plate is clamped in the second recess between the first contact surface of the second housing part and the second contact surface of the second housing part in such a way that a first end of the second spring plate is supported on the first contact surface of the second housing part, the second spring plate extends from the first contact surface of the second housing part to the second contact surface of the second housing part, and a second end of the second spring plate presses on the second contact surface of the second housing part, to transmit a second clamping and/or braking force to the object to be clamped and/or braked; and a first latching means of the second housing part and a second latching means of the second housing part, wherein the two housing parts are arranged and fastened with respect to one another such that the first and second recesses together form an inner space within the housing; and a spring arranged in the inner space, comprising the first annular spring plate and the second annular spring plate, wherein the first and second spring plates are arranged within the inner space such that at least one pressure space is formed in the inner space, which pressure space is at least partially delimited by the first and second spring plates, wherein the pressure space is ventilable or ventable and can be acted on by positive pressure of a pressure medium which is suppliable to the housing, wherein the first spring plate is clamped in the first recess between the first contact surface of the first housing part and the second contact surface of the first housing part such that a first end of the first spring plate is latched by the first latching means of the first housing part and a second end of the first spring plate is latched by the second latching means of the first housing part; and wherein the second spring plate is clamped in the second recess between the first contact surface of the second housing part and the second contact surface of the second housing part such that a first end of the second spring plate is latched by the first latching means of the second housing part and a second end of the second spring plate is latched by the second latching means of the second housing part; and wherein the first and second spring plates are arranged relative to the at least one pressure space such that by ventilating or venting the pressure space or acting on the pressure space with positive pressure, a bending of at least one of the first and second spring plates is changeable and thereby the device changes between an open state, in which the object is spaced apart from the first and second clamping surfaces, and a closed state, in which one or more of the first and second clamping surfaces transmit a clamping and/or braking force to the object.

18. The clamping and/or braking device according to claim 17, wherein the at least one pressure space comprises a first pressure space which is arranged outside the spring between at least one of the spring plates and the housing.

19. The clamping and/or braking device according to claim 18, wherein the first spring plate is designed, by ventilating the first pressure space or by acting on the first pressure space with positive pressure, to reduce its bending in order, when the first end of the first spring plate is supported on the first contact surface of the first housing part, to press with the second end of the first spring plate onto the second contact surface of the first housing part such that thereby a transmission of a clamping and/or braking force from the clamping surface of the clamping element of the first housing part to the object to be clamped and/or braked is effected and the device changes from the open state to the closed state.

20. The clamping and/or braking device according to claim 18, wherein the second spring plate is designed, by ventilating the first pressure space or by acting on the first pressure space with positive pressure, to reduce its bending in order, when the first end of the second spring plate is supported on the first contact surface of the second housing part, to press with the second end of the second spring plate onto the second contact surface of the second housing part such that thereby a transmission of a clamping and/or braking force from the clamping surface of the clamping element of the second housing part to the object to be clamped and/or braked is effected and the device changes from the open state to the closed state.

21. The clamping and/or braking device according to claim 18, wherein the device is designed such that by ventilating the first pressure space or by acting on the first pressure space with positive pressure, the first contact surface and the second contact surface of at least one of the two housing parts move away from one another and/or the bending of at least one of the spring plates is reduced, and thereby the device changes from the open state to the closed state.

22. The clamping and/or braking device according to claim 17, wherein the at least one pressure space comprises a second pressure space, wherein the second pressure space is arranged within the spring between the two spring plates.

23. The clamping and/or braking device according to claim 22, wherein the device is designed such that by ventilating the second pressure space or by acting on the second pressure space with positive pressure, the first contact surface and the second contact surface of at least one of the two housing parts move towards one another and/or the bending of at least one of the spring plates is increased, and thereby the device changes from the closed state to the open state.

* * * * *

UNITED STATES PATENT AND TRADEMARK OFFICE
CERTIFICATE OF CORRECTION

PATENT NO. : 12,397,388 B2  
APPLICATION NO. : 18/861648  
DATED : August 26, 2025  
INVENTOR(S) : Edmund Likus Page 1 of 1

It is certified that error appears in the above-identified patent and that said Letters Patent is hereby corrected as shown below:

On the Title Page

Item (71) "Applicant" please replace "HEMA Maschinen-und Apparateschutz GmbH, Seligenstadt (DE)" with --HEMA Maschinen- und Apparateschutz GmbH, Seligenstadt (DE)--

Item (73) "Assignee" please replace "HEMA Maschinen—und Apparateschutz GmbH, Seligenstadt (DE)" with --HEMA Maschinen- und Apparateschutz GmbH, Seligenstadt (DE)--

Signed and Sealed this  
Twenty-first Day of October, 2025

John A. Squires  
*Director of the United States Patent and Trademark Office*